United States Patent
Gunther et al.

(10) Patent No.: US 7,158,911 B2
(45) Date of Patent: Jan. 2, 2007

(54) METHODS AND APPARATUS FOR THERMAL MANAGEMENT OF AN INTEGRATED CIRCUIT DIE

(75) Inventors: Stephen H. Gunther, Beaverton, OR (US); Frank Binns, Hillsboro, OR (US); Jack D. Pippin, Portland, OR (US); Linda J. Rankin, Portland, OR (US); Edward A. Burton, Hillsboro, OR (US); Douglas M. Carmean, Beaverton, OR (US); John M. Bauer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 141 days.

(21) Appl. No.: 10/821,822

(22) Filed: Apr. 9, 2004

(65) Prior Publication Data

US 2004/0195674 A1    Oct. 7, 2004

Related U.S. Application Data

(63) Continuation of application No. 09/784,255, filed on Feb. 14, 2001, now Pat. No. 6,789,037, which is a continuation-in-part of application No. 09/281,237, filed on Mar. 30, 1999, now Pat. No. 6,393,374.

(51) Int. Cl.
H01L 31/58    (2006.01)
(52) U.S. Cl. ..................................... 702/132
(58) Field of Classification Search ................ 702/132; 361/1
See application file for complete search history.

(56) References Cited

U.S. PATENT DOCUMENTS

| | | |
|---|---|---|
| 4,442,972 A | 4/1984 | Sahay et al. |
| 4,488,824 A | 12/1984 | Salem |
| 4,591,855 A | 5/1986 | Blackburn |
| 4,779,161 A | 10/1988 | DeShazo, Jr. |
| 4,787,007 A | 11/1988 | Matsumura et al. |
| H562 H | 12/1988 | Trachier et al. |
| 4,789,819 A | 12/1988 | Nelson |

(Continued)

FOREIGN PATENT DOCUMENTS

EP    0523736 A1    1/1993

OTHER PUBLICATIONS

Chan Shu-Park 'section I, Circuits' The electrical Engineering handbook, Ed. Richard C. Dorf, Boca raton: CRC Press LLC, 2000, p. 1.*

(Continued)

*Primary Examiner*—Bryan Bui
*Assistant Examiner*—Tung S. Lau
(74) *Attorney, Agent, or Firm*—Kerry D. Tweet

(57) ABSTRACT

An integrated, on-chip thermal management system providing closed-loop temperature control of an IC device and methods of performing thermal management of an IC device. The thermal management system comprises a temperature detection element, a power modulation element, a control element, and a visibility element. The temperature detection element includes a temperature sensor for detecting die temperature. The power modulation element may reduce the power consumption of an IC device by directly lowering the power consumption of the IC device, by limiting the speed at which the IC device executes instructions, by limiting the number of instructions executed by the IC device, or by a combination of these techniques. The control element allows for control over the behavior of the thermal management system, and the visibility element allows external devices to monitor the status of the thermal management system.

30 Claims, 6 Drawing Sheets

U.S. PATENT DOCUMENTS

| | | |
|---|---|---|
| 4,799,176 A | 1/1989 | Cacciatore |
| 4,807,144 A | 2/1989 | Joehlin et al. |
| RE32,960 E | 6/1989 | Levine |
| 4,903,106 A | 2/1990 | Fukunaga et al. |
| 4,924,112 A | 5/1990 | Anderson et al. |
| 4,935,864 A | 6/1990 | Schmidt et al. |
| 5,008,771 A | 4/1991 | Palara |
| 5,025,248 A | 6/1991 | Bergeron |
| 5,064,296 A | 11/1991 | Huijsing et al. |
| 5,077,491 A | 12/1991 | Heck et al. |
| 5,085,526 A | 2/1992 | Sawtell et al. |
| 5,087,870 A | 2/1992 | Salesky et al. |
| 5,105,366 A | 4/1992 | Beckey |
| 5,149,199 A | 9/1992 | Kinoshita et al. |
| 5,170,344 A | 12/1992 | Berton et al. |
| 5,189,314 A | 2/1993 | Georgiou et al. |
| 5,195,827 A | 3/1993 | Audy et al. |
| 5,253,938 A | 10/1993 | Stixrud |
| 5,255,149 A | 10/1993 | Matsuo |
| 5,256,914 A | 10/1993 | Booner |
| 5,283,631 A | 2/1994 | Koerner et al. |
| 5,287,292 A | 2/1994 | Kenny et al. |
| 5,291,607 A | 3/1994 | Ristic et al. |
| 5,325,286 A | 6/1994 | Weng et al. |
| 5,359,234 A | 10/1994 | Atriss et al. |
| 5,359,236 A | 10/1994 | Giordano et al. |
| RE34,789 E | 11/1994 | Fraden |
| 5,422,832 A | 6/1995 | Moyal |
| 5,440,305 A | 8/1995 | Signore et al. |
| 5,453,682 A | 9/1995 | Hinrichs et al. |
| 5,560,017 A | 9/1996 | Barret et al. |
| 5,586,270 A | 12/1996 | Rotier et al. |
| 5,675,297 A * | 10/1997 | Gose et al. ............... 332/109 |
| 5,713,030 A | 1/1998 | Evoy |
| 5,838,578 A | 11/1998 | Pippen |
| 6,101,516 A | 8/2000 | Wolrich et al. |
| 6,137,329 A | 10/2000 | Kardash |
| 6,172,611 B1 * | 1/2001 | Hussain et al. ........... 340/584 |
| 6,336,593 B1 | 1/2002 | Bhatnagar |

OTHER PUBLICATIONS

Shu-Yuan Chin et al., "A New Type of Curvature-Compensated CMOS Bandgap Voltage References", *VLSITSA*, 1991, 6 pages, IEEE Catalog No. 91TH0368-1, ISBN 0-7803-0035-X.

Marco Ferro et al., "A Floating CMOS Bandgap Voltage Reference for Differential Applications", *IEEE Journal of Solid-State Circuits*, vol. 24, No. 3, Jun. 1989, p. 690-697, ISSN 0018-9200.

O. Salminen et al., "The Higher Order Temperature Compensation of Bandgap Voltage References", *IEEE International Symposium on Circuits and Systems*, vol. 3, San Diego, California, May 10-13, 1992, p. 1388-1391.

Hector Sanchez et al., "Thermal Management System for High Performance POWERPC Microprocessors", *IEEE CompCon 97*, San Jose, California, Feb. 23-26, 1997, p. 325-330, IEEE Computer Society Press, Los Alamitos, California.

Phillip E. Allen et al., "CMOS Analog Circuit Design", 1987, p. 529-551, ISBN 0-03-006587-9, Holt, Rinehart and Winston, New York, New York.

Analog Devices, Inc. brochure, "Low Power, Programmable Temperature Controller: TMP01", Rev. C., 1995, p. 1-16.

* cited by examiner

METHODS AND APPARATUS FOR THERMAL MANAGEMENT OF AN INTEGRATED CIRCUIT DIE

CROSS-REFERENCE TO RELATED APPLICATIONS

This application is a continuation of U.S. patent application Ser. No. 09/784,255, filed Feb. 14, 2001, now U.S. Pat. No. 6,789,037, which is a continuation-in-part of U.S. patent application Ser. No. 09/281,237, filed Mar. 30, 1999, now U.S. Pat. No. 6,393,374.

FIELD OF THE INVENTION

Thermal management of an integrated circuit die and, more specifically, integrated thermal management systems and methods of use for providing on-chip, closed-loop temperature control at one or more die locations.

BACKGROUND OF THE INVENTION

An integrated circuit (IC) device, such as a microprocessor, may include circuitry comprised of many types of discrete circuit components, including transistors, resistors, and capacitors, as well as other components. Semiconductor manufacturers are subject to ever-increasing pressure to increase the speed and performance of such IC devices while, at the same time, reducing package size and maintaining reliability. Thus, by way of example, a modern microprocessor may comprise a die including literally millions of closely-spaced transistors and other discrete components exhibiting sub-micron dimensions and operating at clock rates exceeding 1 GHz. As a result, these microprocessors exhibit high power dissipation and, hence, a corresponding heat load requiring increased cooling capacity, and these high cooling requirements are pushing conventional thermal management technology to its limit.

The power consumption of a microprocessor, as well as other types of IC devices, is generally proportional to the operating frequency and the number of transistors required to perform the applications or instructions being executed. The heat generated within a die as a result of this power dissipation must be properly transferred away from the die. If adequate heat transfer does not occur, the die temperature may achieve a level at which performance and reliability suffer or can no longer be guaranteed and, if unchecked, a die temperature may be reached at which permanent structural damage to the microprocessor occurs.

The power dissipation of a microprocessor may, however, cause uneven heating of the die. Because one application may primarily utilize one portion of the microprocessor circuitry—i.e., a functional unit, such as an arithmetic and logic unit—while another application may primarily utilize a different functional unit, vastly different amounts of heat may be generated on the die at various locations. Thus, for a particular application, a microprocessor or other IC device may exhibit high temperature locations, or "hot spots," corresponding to die locations proximate one or more functional units experiencing a high workload. Also, with the advent in recent years of microprocessors possessing high speed and performance, there has been increasing disparity between typical power—i.e., the power consumed when running normal applications, such as those run on a personal computer—and maximum power—i.e., the power consumed while running a synthetic, high-power workload specifically designed for maximum power consumption. Thus, although a microprocessor may rarely, if ever, achieve maximum power for an extended period, techniques for thermal management of microprocessors may, in some instances, target the maximum power level to insure that die temperatures will not exceed thermal design limits during operation, potentially causing heat-induced failure or damage to the microprocessor.

As is suggested above, thermal management is a critical aspect of the design of modern microprocessors, as well as other IC devices. To remove heat from a semiconductor die, it is known in the art to couple a passive heat transfer device to the die. For example, it is common to thermally couple a heat sink or heat pipe, or other liquid cooling element, to a semiconductor die; however, such passive components possess a limited capacity to dissipate heat. Heat removal may also be facilitated by an active heat transfer device such as a fan, which are often employed in combination with a heat sink having a large surface area (e.g., a plurality of fins). There are, however, several disadvantages associated with the use of fans for cooling IC devices, including poor reliability compared to semiconductor devices, noise, and space requirements. Also, active devices such as fans, as well as the above-described passive device, are generally over-designed for typical power dissipation in order to address the worst case scenario—i.e., the dissipation of maximum power.

Another approach to thermal management of an IC die is to actively monitor the temperature of the die. Early thermal monitoring systems consisted of a temperature sensor attached to a heat sink, the heat sink being coupled with a die. If the sensor detected some predetermined threshold temperature, off-chip control hardware and software initiated a response, generally the switching of power to a fan or a reduction in clock frequency. Such thermal monitoring systems are inherently inaccurate due to poor thermal coupling (i.e., a thermal time delay) between the sensor and die. Also, the off-chip control hardware requires the addition of other components to the IC device being sensed or to the next-level assembly, and these added components may consume more surface area in the next-level assembly (i.e., surface area of a circuit board) than the IC device itself.

More recently, manufacturers have introduced on-chip thermal sensors that are fabricated directly on a semiconductor die. Although on-chip thermal sensors substantially eliminate the inherent latency of the separately-attached thermal sensor, currently available sensor control and interface logic does not provide reliable temperature measurement and/or closed-loop thermal control. A lack of integration amongst the various elements comprising the conventional sensor control and interface logic, as well as poor integration with the IC device itself, provide a thermal management system exhibiting insufficient response time and, hence, unreliable temperature control.

Semiconductor manufacturers have also turned to lower supply voltages to reduce power dissipation of IC devices. However, the increasing speed and circuit density of newer microprocessors will necessitate even lower supply voltages, but the electrical noise generally present in any system inherently limits the degree to which supply voltages may be further reduced.

Accordingly, there is a need in the art for an integrated thermal management system and method of use for microprocessors and other IC devices providing reliable on-chip, closed-loop temperature control.

DETAILED DESCRIPTION OF THE INVENTION

The above-noted deficiencies of prior art thermal management techniques are overcome by providing a tightly integrated thermal management system entirely contained on a semiconductor die, such as a microprocessor. Although illustrated below in the context of thermal management of a microprocessor, those of ordinary skill in the art will understand that the methods and apparatus described herein are generally applicable to all types of IC devices.

Figure 1:
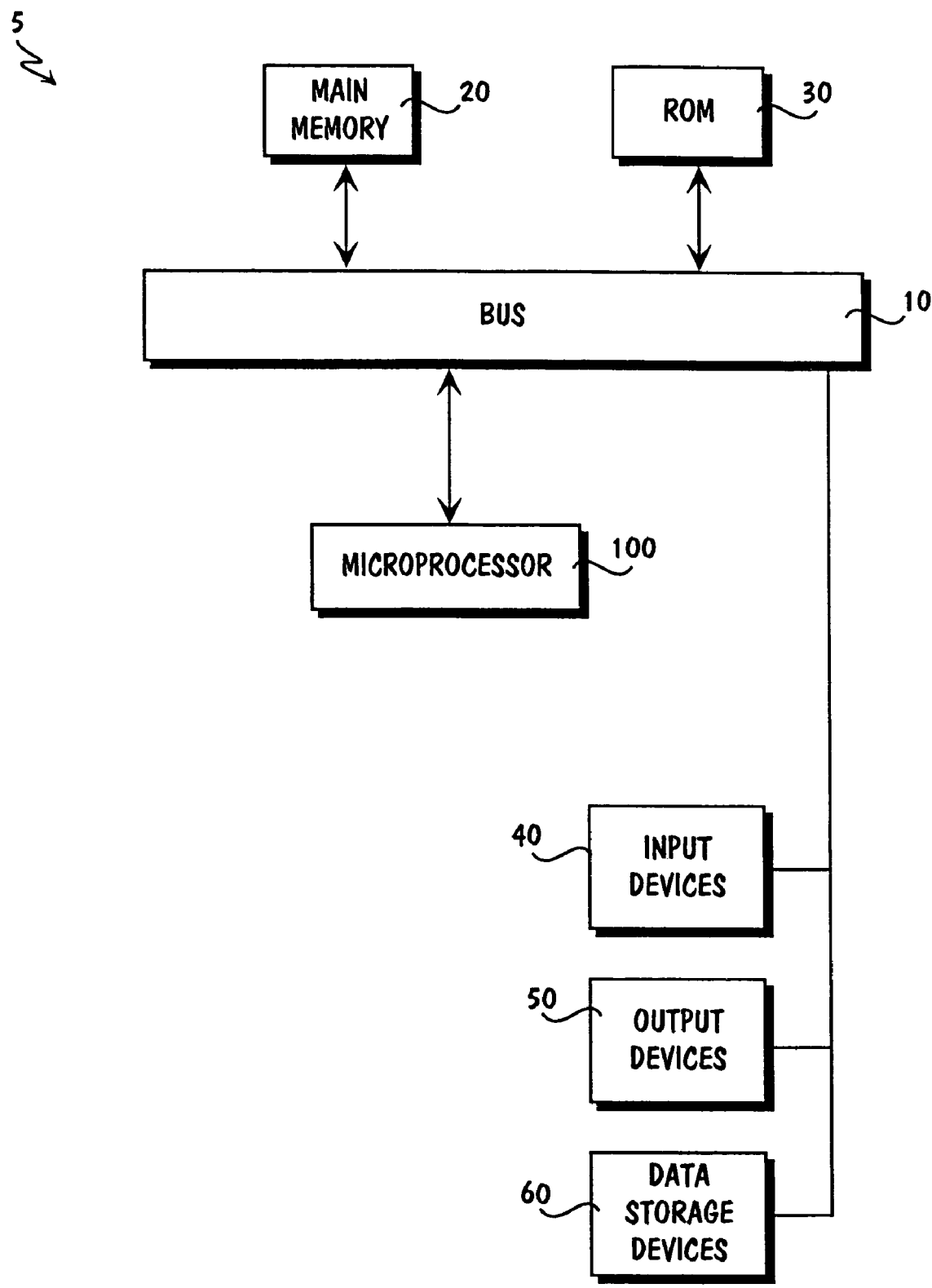
FIG. 1 is a schematic diagram of one embodiment a computer system incorporating a microprocessor having a thermal management system.

Shown schematically in FIG. 1 is a computer system 5 incorporating a microprocessor 100 providing on-chip, closed-loop thermal management. The microprocessor 100 is coupled via a bus 10 to main memory 20, which may comprise one or more dynamic random access memory (DRAM) devices for storing information and instructions to be executed by microprocessor 100. The main memory 20 may also be used for storing temporary variables or other intermediate information during execution of instructions by microprocessor 100. Computer system 5 also includes read only memory (ROM) 30 coupled via bus 10 to microprocessor 100 for storing static information and instructions for microprocessor 100.

The computer system 5 includes one or more input devices 40, such as a keyboard or mouse, coupled to the microprocessor 100 through bus 10. Also coupled to the microprocessor 100 via bus 10 are one or more output devices 50. Typical output devices 50 include printers and display monitors. The computer system 5 further includes one or more data storage devices 60 coupled to the microprocessor 100 via the bus 10. Common data storage devices include hard disk drives, floppy disk drives, and CD ROM drives. It will be understood by those of ordinary skill in the art that the computer system 5 may include other components and subsystems in addition to those shown and described with respect to FIG. 1. By way of example, the computer system 5 may include video memory, cache memory, as well as other dedicated memory, and additional signal lines and busses.

Figure 2:
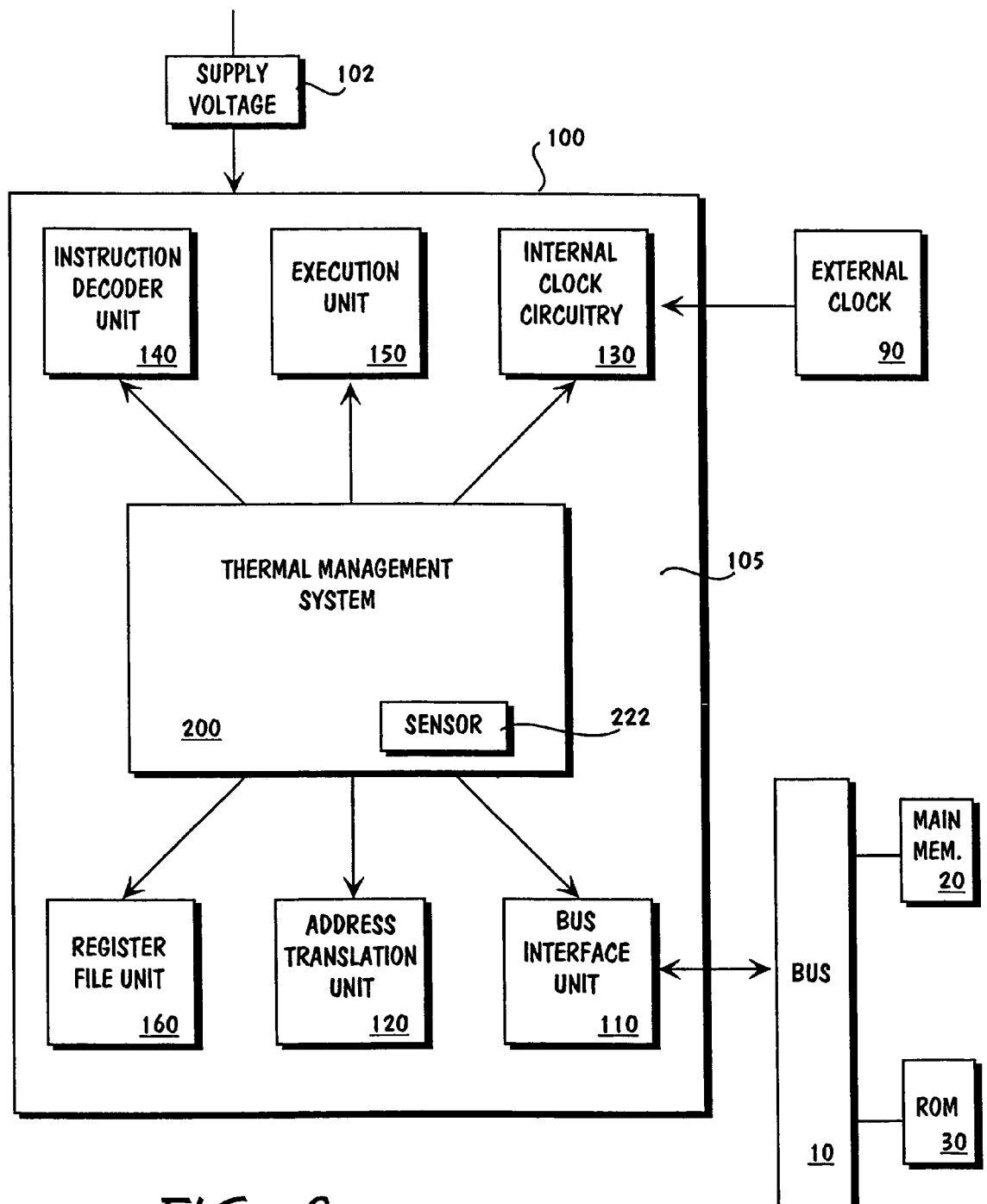
FIG. 2 is a schematic diagram of one embodiment of the microprocessor shown in FIG. 1.

Referring now to FIG. 2, a schematic diagram of microprocessor 100 is shown. Microprocessor 100 comprises a semiconductor die 105 having internal clock circuitry 130 and a plurality of functional units formed thereon, including a bus interface unit 110, an address translation unit 120, instruction decoder unit 140, execution unit 150, and register file unit 160. The microprocessor 100 is powered by a supply voltage ($V_{cc}$) 102.

The schematic diagram of microprocessor 100 presented in FIG. 2 is for illustrative purposes only, and those of ordinary skill in the art will understand that, in practice, a modern microprocessor is generally more complex and may include additional components, such as internal cache, which have been omitted for ease of understanding. Although not shown for clarity, it should also be understand that the internal clock circuitry 130 and various functional units (i.e., bus interface unit 110, address translation unit 120, instruction decode unit 140, execution unit 150, and register file unit 160, as well as internal cache and other systems) of microprocessor 100 are electrically coupled to one another through internal buses and other communication paths. Accordingly, the illustrated microprocessor 100 is presented without limitation, and the apparatus and methods described herein are generally applicable to all types of microprocessors, irrespective of the specific architecture employed.

The bus interface unit 110 is coupled to bus 10, as well as main memory 20 and ROM 30. Bus interface unit 110 facilitates transmission of data between main memory 20 and microprocessor 100, and also performs fetching of instructions and other data from ROM 30. Address translation unit 120 performs memory management for microprocessor 100. Specifically, address translation unit stores the memory addresses—whether in main memory 20, internal cache, or other memory—of data being used by the microprocessor 100 during operation. Instruction decoder unit 140 decodes instructions and other control signals received by microprocessor 100.

Execution unit 150 is intended to present a broad category of microprocessor functional units comprising a wide range of functions. By way of example, execution unit 150 may comprise an arithmetic and logic unit for performing arithmetic operations, including shifts, addition, subtraction, multiplication, and division. Register file unit 160 may comprise one or more types of registers for storing data being used by microprocessor 100. For example, register file unit 160 may include integer registers, status registers, instruction pointer registers, and floating point registers, as well as others. If present, internal cache may, for example, be used to store data and control signals from main memory 20.

External clock 90 provides an external clock signal to internal clock circuitry 130. The internal clock circuitry 130, in turn, provides to microprocessor 100 an internal clock signal derived from the external clock signal. For example, the internal clock circuitry 130 may include a phase lock loop (PLL) circuit that adjusts the frequency of the internal clock signal to a specified multiple of the external clock signal frequency. The internal clock signal that is output from internal clock circuitry 130 is also referred to herein as the system clock for microprocessor 100.

Microprocessor 100 also includes a thermal management system 200. In one embodiment, thermal management system 200 is formed directly on the die 105 of microprocessor 100 and is entirely contained thereon. Thermal management system 200 is configured to interface with one or more of the functional units on microprocessor 100, as well as internal clock circuitry 130, and to maintain the temperature of die 105 below a specified threshold temperature, the threshold temperature being less than the temperature at which heat-induced damage or operating failures are expected to occur. To measure the die temperature, thermal management system 200 includes at least one temperature sensor 222 formed on die 105 and thermally coupled thereto.

Figure 3:
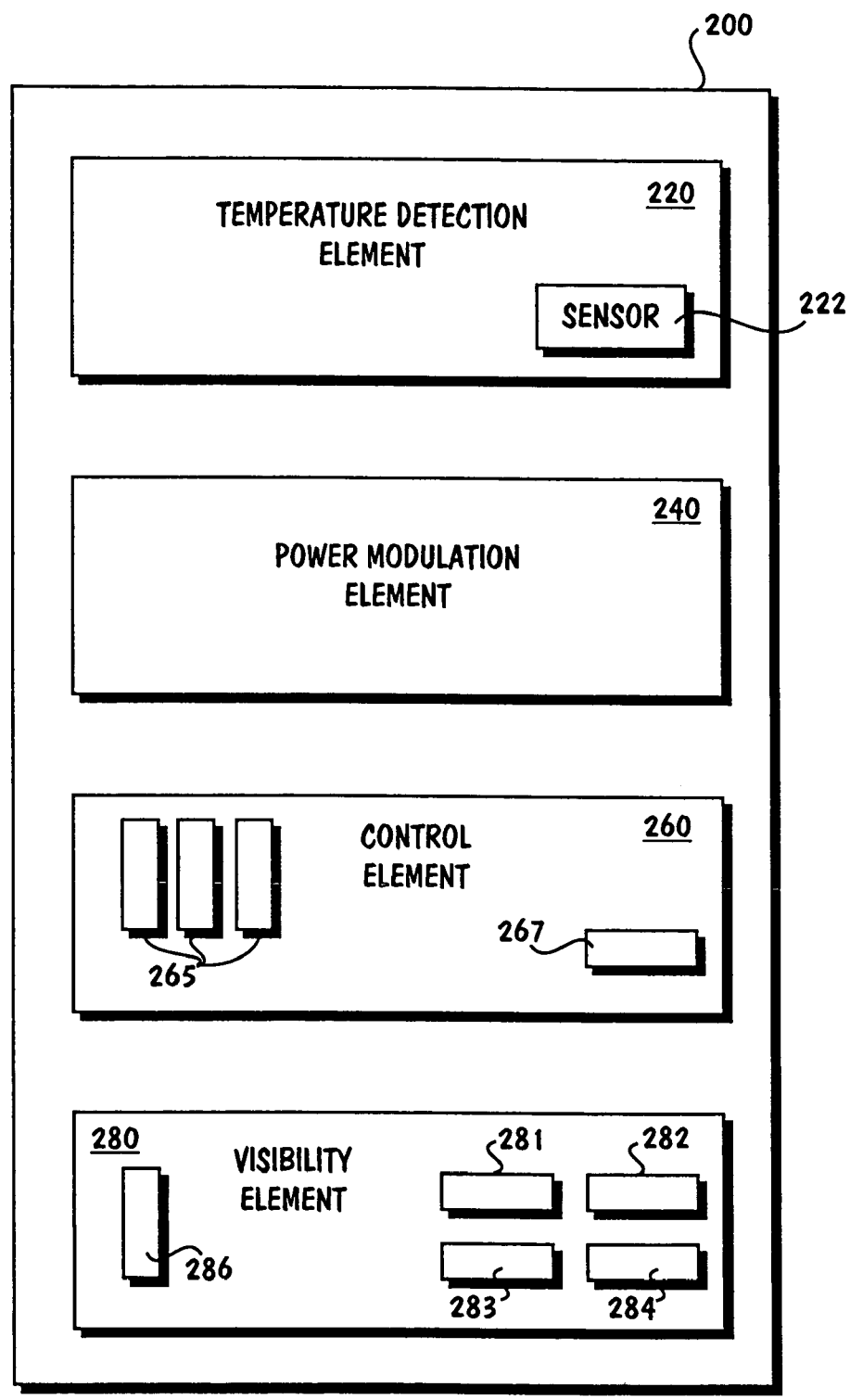
FIG. 3 is a schematic diagram of one embodiment of the thermal management system.

Shown in FIG. 3 is a schematic diagram of one embodiment of the thermal management system 200. In the illustrated embodiment, the thermal management system 200 comprises four integrated elements: (1) a temperature detection element 220, including at least one thermal sensor 222, as noted above; (2) a power modulation element 240; (3) a control element 260; and (4) a visibility element 280, all of which will be described in greater detail below. It should be understood, however, that other embodiments of a thermal management system 200 may not include all of these elements. For example, a thermal management system 200 may not include a visibility element 280. Further, although the embodiment illustrated herein comprises a thermal management system contained entirely on the die 105 of microprocessor 100, one or more elements or components of the thermal management system 200 may be located off-chip or comprise separate parts attached to the die 105. By way of example, a thermal management system 200 may include a temperature sensor that is separately fabricated and subsequently attached to an IC device.

Figure 4:
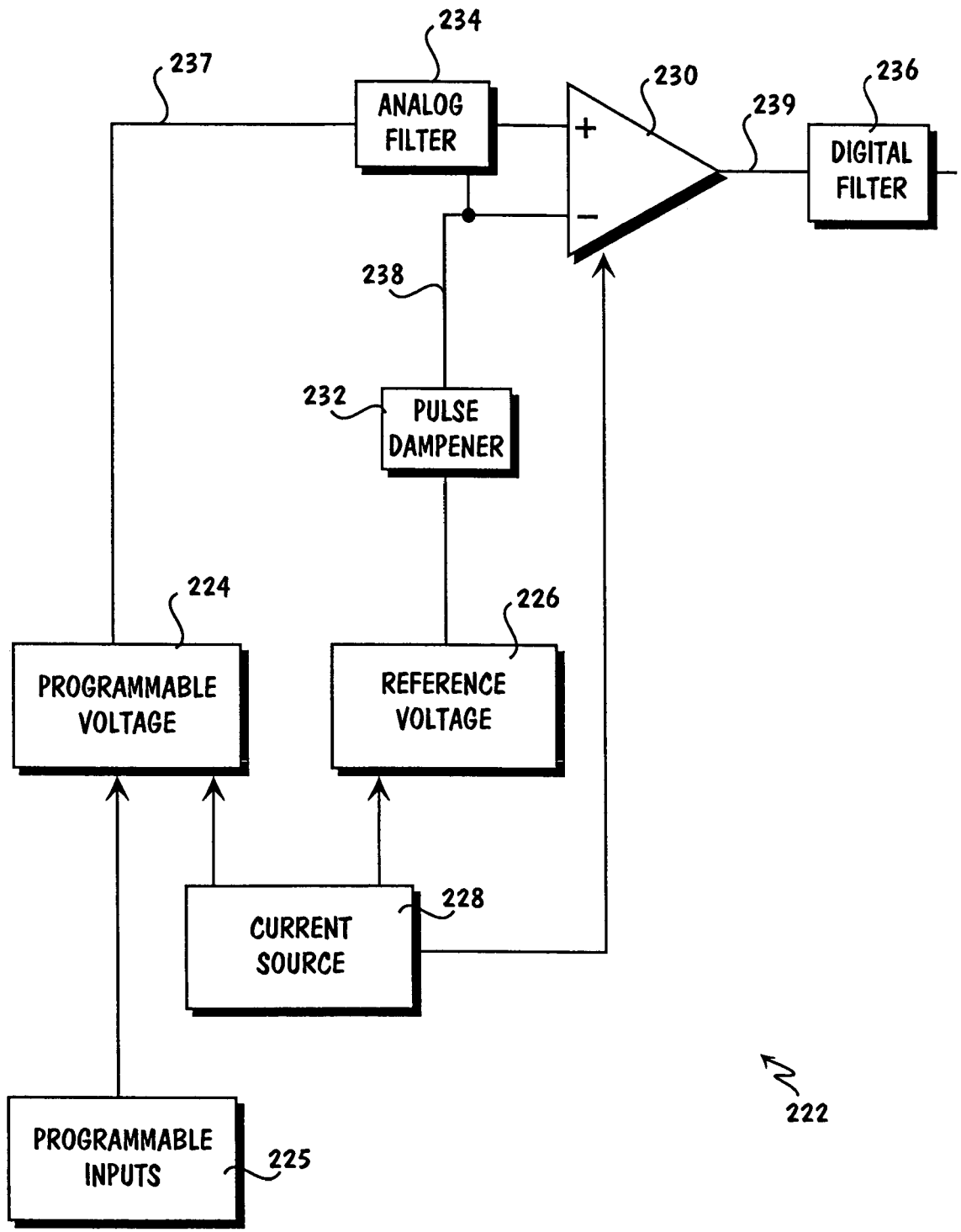
FIG. 4 is a schematic diagram of an exemplary embodiment of a temperature sensor for use in the thermal management system shown in FIG. 3.

Shown in FIG. 4 is an exemplary embodiment of a temperature sensor 222 suitable for use with thermal management system 200. The temperature sensor 222 described herein with respect to FIG. 4 is provided for illustrative purposes only, and those of ordinary skill in the art will appreciate that temperature sensor 222 may comprise any other suitable temperature sensor known in the art.

The temperature sensor 222 comprises a programmable temperature sensor comprised of circuitry formed directly on the die 105 during manufacture. There exists a number of advantages to forming the sensor 222 directly on die 105. First, improved thermal coupling between the sensor 222 and die 105 is achieved. Second, the temperature sensor 222 can be calibrated at the chip level (as opposed to system level calibration), enabling manufacturing and processing variations from one wafer to the next, and from one section of a wafer to the next, to be nullified.

Referring to FIG. 4, temperature sensor 222 includes a programmable voltage 224 and a reference voltage 226, both of which are powered by a current source 228. Sensor 222 further includes a comparator 230, also powered by current source 228. A signal line 237 couples the programmable voltage 224 to comparator 230 and, similarly, a signal line 238 couples the reference voltage 226 to comparator 230, the comparator having an output 239. The reference voltage 226 provides a relatively constant-voltage to the comparator 230 over a temperature range of interest. Programmable voltage 224 generates a voltage dependent upon the temperature of die 105 in the vicinity of temperature sensor 222. The comparator 230 compares the programmable voltage 224 against the reference voltage 226 and, if the programmable voltage 224 equals or exceeds the reference voltage 226, the comparator provides a high logic level (i.e., a logical 1) on its output 239; otherwise, the comparator provides a low logic level (i.e., a logical 0) on output 239. The voltage/temperature characteristics of the sensor 222 can be altered via programmable inputs 225—e.g., a multiplier value—such that the comparator 230 will provide a high logic level at a specified threshold temperature.

Figure 5:
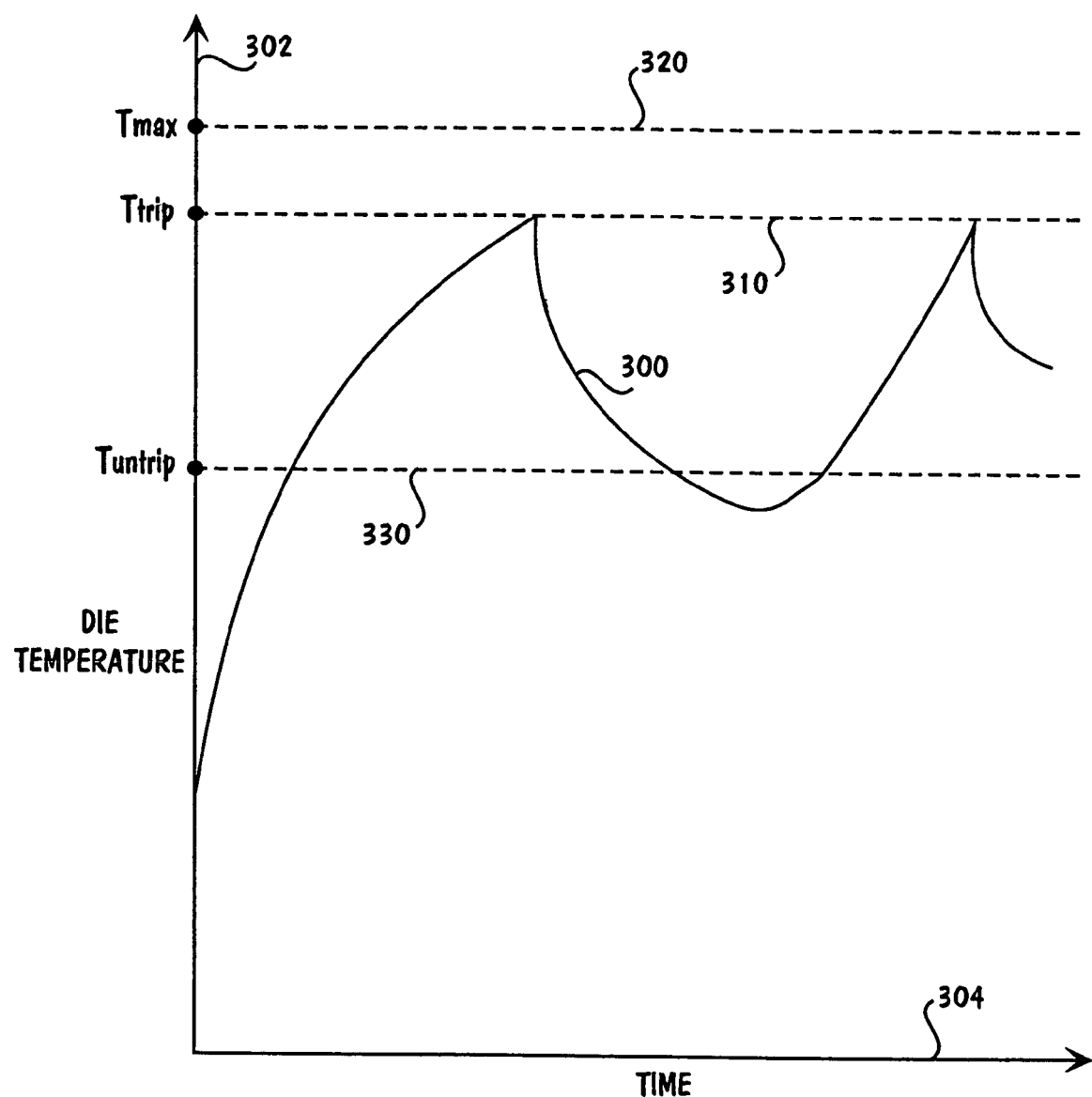
FIG. 5 is an exemplary graph of die temperature as a function of time for a microprocessor having the thermal management system according to FIG. 3.

With reference to FIG. 5, which shows an exemplary curve 300 of die temperature 302 plotted as a function of time 304, the threshold temperature corresponds to a trip point 310—which will be referred to herein as $T_{trip}$—selected to insure the temperature of die 105 does not exceed a maximum temperature (i.e., $T_{max}$) 320 beyond which mechanical and electrical failure of the microprocessor 100 is imminent. To protect against die failure and processor errors, the trip point 310 is generally set at a pre-determined level below $T_{max}$ 320 to insure the maximum thermal condition will not be achieved. Generally, $T_{trip}$ 310 is set as close as possible to $T_{max}$ 320 to enable microprocessor 100 to operate at or near its highest speed and capacity. In response to detection of $T_{trip}$ 310, the thermal management system 200 will initiate actions, such as engagement of a power reduction mechanism, necessary to lower the die temperature 302 to a second, lower temperature level relative to $T_{trip}$ 310, at which level the comparator 230 of sensor 222 will again assert a low logical level on output 239. This second, relatively lower temperature level, which will be referred to herein as $T_{untrip}$ 330, is set at a temperature differential below $T_{trip}$ 310 to insure all portions of die 105 have sufficiently cooled prior to returning microprocessor 100 to normal operation and, thereby, accounting for any thermal hysteresis within microprocessor 100.

In an alternative embodiment, thermal hysteresis may be accounted for by simply engaging, upon detection of $T_{trip}$ 310, a power reduction mechanism for a set time period. After the set time period expires, the temperature sensor 222 is polled to determine if the die temperature still equals or exceeds $T_{trip}$ 310 and, if so, a power reduction mechanism is again engaged for the set time period. The process repeats until, at the end of a time period, the temperature sensor 222 indicates that the die temperature has fallen below the trip point 310, at which time the power reduction mechanism is halted. In a further alternative embodiment, a power reduction mechanism is engaged for an initial time period upon detection of $T_{trip}$ 310. Upon expiration of the initial time period, the temperature sensor 222 is continuously polled for a die temperature measurement. If, at any time thereafter, the temperature sensor 222 indicates that the die temperature has fallen below $T_{trip}$ 310, the power reduction mechanism is disengaged.

As noted above, semiconductor die 105 will likely heat unevenly during operation, leading to hot spots on die 105. This uneven heating results from vastly differing application dependent workloads being placed upon the various functional units of microprocessor 100. For example, an arithmetic intensive application may place a high workload on execution unit 150 relative to other functional units, causing high heat generation near execution unit 150. Similarly, a memory intensive application may subject the bus interface unit 110 and/or address translation unit 120 to a relatively high workload, resulting in high temperatures in the vicinity of these functional units, respectively. To compensate for this uneven die heating, the die 105 is thermally mapped to determine the temperature distributions across die 105 during the execution of various types of applications, and the temperature sensor 222 is positioned on the die 105 at a location corresponding to the location of the most severe hot spot—i.e., that location on die 105 achieving the greatest temperature and/or most quickly reaching the greatest temperature.

In an alternative embodiment, multiple temperature sensors 222 are provided on microprocessor 100. In this embodiment, each of the multiple temperature sensors 222 is positioned on the die 105 at a location corresponding to a hot spot. If any one of the multiple thermal sensors 222 reaches $T_{trip}$ 310, the thermal management system will take appropriate corrective measures in the vicinity of the tripped sensor or, alternatively, across the entire die 105.

Due to errors in sensor placement, as well as sensor inaccuracies, the temperature indicated by temperature sensor 222 may not reflect the true temperature at the sensor location and/or the true temperature of the hottest location on the die 105. For example, if the sensor 222 is erroneously positioned at a location offset from the true location of a hot spot on die 105, the hot spot may reach $T_{trip}$ 310 well prior to the time at which the sensor location achieves this temperature; thus, the output 239 of sensor 222 will lag behind the actual thermal conditions existing at the hot spot. As a result, when the sensor location achieves the $T_{trip}$ 310 level, the temperature at the true location of the hot spot will already have exceeded this temperature level, potentially approaching $T_{max}$ 320. Similarly, sensor errors may result in a failure to timely provide an indication of $T_{trip}$ 310 at the hot spot. To safeguard against heat-induced mechanical or electrical failures, guard bands are used in the selection of $T_{trip}$ 310. A guard band is a specified temperature delta added to (or subtracted from) the trip point to compensate for sensor inaccuracies and location errors. In other words, the trip point 310 is lowered by the temperature delta to insure that, when the sensor 222 indicates $T_{trip}$ 310 (by asserting a high logical level), the true location of a hot spot on die 105 has not actually exceeded the trip point.

In another embodiment, as shown in FIG. 4, the temperature sensor 222 may include one or more filters. As noted above, each of the comparator 230 and reference voltage 226 is powered by current source 228. Although current source 228 may be a constant current source, enabling reference voltage 226 to generate a constant voltage level over the temperature range of interest, the power signal from current source 228 may include electrical noise and other transients capable of disrupting operation of temperature sensor 222. For example, small voltage spikes on reference voltage 226 may cause the comparator 230 to signal that the die 105 has achieved the trip point when, in fact, the die has not yet reached this temperature or, likewise, cause the comparator 230 to signal that the die 105 is below the trip point when, in fact, the die 105 is above this temperature. To nullify such voltage spikes, the temperature sensor 222 may include one or more analog filters and/or one or more digital filters.

Referring to FIG. 4, an analog filter or pulse dampener 232 may be coupled to signal line 238 to dampen out or remove voltage spikes, such that the comparator 230 does not see these transients. In addition to pulse dampener 232—or, optionally, in lieu of pulse dampener 232—the temperature sensor 222 may include an analog filter 234 coupled to signal line 237, as well as to signal line 238, and configured to add any voltage spike on reference voltage 226 to programmable voltage 224, such that the respective voltage transients on signal lines 237 and 238 will cancel each other at comparator 230.

Referring again to FIG. 4, a digital filter 236 may be coupled to the output 239 of comparator 230. Digital filter 236 includes an up-down counter configured to count the number of system clock pulses that occur during a logic state at comparator 230. When the output 239 of comparator 230 transitions from a logical low to a logical high, the up-down counter will count upwards, incrementing once for every clock pulse occurring while the comparator output 239 remains high. When the output 239 of comparator 230 transitions from a logical high back to logical low, the up-down counter will count downwards, decrementing once for every clock pulse occurring while the comparator output 239 remains low.

As noted above, electrical noise present in reference voltage 226 may cause the comparator 230 to change states when, in fact, an actual corresponding change in temperature conditions has not occurred. The digital filter 236 is configured to provide an output—i.e., a change of state—only if the up-down counter counts a specified number of clock cycles that indicates a "real" temperature event has occurred. If the comparator output 239 is continually transitioning between logical high and logical low due to electrical noise, the up-down counter of digital filter 236 will not increment past the specified number of clock cycles, as the transitions from high to low and from low to high due to noise will essentially cancel out. Thus, by allowing state transitions at the comparator output 239 due to electrical noise to cancel out, the digital filter 236 substantially eliminates the effects of electrical noise in temperature sensor 222. Also, the digital filter 236 can be tuned for various operating conditions and environments by altering the specified number of clock cycles corresponding to a real temperature event.

Power modulation element 240 (see FIG. 3) comprises control and logic circuitry configured to perform any one or a combination of techniques directed at reducing the power dissipation of microprocessor 100 to lower the temperature of die 105, or to lower the temperature of a specific region thereof. Control and logic circuitry for power modulation element 240 is entirely contained on semiconductor die 105, as noted above.

The integration of the temperature detection element 220 and power modulation element 240 directly on die 105 provides several advantages. First, the latency between detection of the trip point and the corresponding response of the power modulation element 240 will be low. Second, by substantially reducing latency effects, efficient power reduction is possible. Specifically, a loss in performance may accompany at least a substantially comparable reduction in power consumption or, if a nonlinear relationship between performance loss and power consumption is achieved, a larger reduction in power consumption. For example, if the power modulation element 240 causes a 10% reduction in performance while operating, this element also provides at least a 10% reduction in power consumption, such an ideal relationship generally being possible if clock frequency is the only variable. Third, as the circuitry for power modulation element 240, as well as for temperature detection element 220, is constructed during the normal course of manufacturing semiconductor die 105, the power modulation element 240 (and thermal management system 200 generally) will add only minimal design and manufacturing costs.

The power modulation element 240 may be configured to implement any one or more of a number of power reduction mechanisms. Such power reduction mechanisms may be broadly classified into those techniques that directly lower the power consumption of microprocessor 100, those techniques that limit the speed at which microprocessor 100 executes instruction, and those techniques that limit the number of instructions executed by microprocessor 100. In addition to these power reduction mechanisms, those of ordinary skill in the art will appreciate that any other suitable power modulation technique may be employed in power modulation element 240.

The power consumption of microprocessor 100 may be directly reduced by lowering the supply voltage ($V_{cc}$) 102 of microprocessor 100. Although there are limits to the extent that supply voltage 102 can be reduced—due to electrical noise and other transients, as noted above—any reduction in supply voltage 102 will result in a corresponding decrease in power consumption (i.e., the product of voltage and current).

There are a number of approaches to reducing the speed at which microprocessor 100 executes instructions and, hence, providing a corresponding reduction in power consumption. As noted above, the power consumption of the microprocessor 100 is proportional to the system clock frequency and the number of transistors required to perform any running applications. One approach comprises simply lowering the system clock frequency provided by internal clock circuitry 130. Diminishing the system clock frequency slows the rate at which microprocessor 100 executes instructions, thereby reducing power consumption.

The system clock signal may also be halted—either periodically or for a set period of time—to microprocessor 100 or to one or more specific functional units thereof. The shutting off of the system clock to specific functional units or the entire microprocessor 100 for a set time period is often referred to as clock gating. Periodically interrupting the system clock to one or more functional units at a specified duty cycle is commonly referred to as clock throttling. It should be noted that the terms clock gating and clock throttling are often used interchangeably, and clock gating can be viewed as a special case of clock throttling in which there is only one cycle. By way of example, for an arithmetic intensive application, clock throttling may be applied to the execution unit 150 at a 50% duty cycle (i.e., periodically halting the system clock to the execution unit 150 for a period of time followed by providing the system clock signal thereto for an equal time period).

Clock throttling may be achieved my modulating the STOPCLOCK signal to the microprocessor 100. The STOPCLOCK request causes the system clock signal to be stopped to the bulk of a microprocessor's logic for a short time period. The STOPCLOCK request is a relatively high priority interrupt, and the delay between the STOPCLOCK signal and the resulting power decrease is relatively short (e.g., less than 1 microsecond). Initiating clock gating or clock throttling is not limited to use of the STOPCLOCK request, and it should be understood that other methods of performing clock gating or clock throttling may be employed.

Alternatively, power consumption of microprocessor 100 may be reduced by selectively blocking clock pulses generated by internal clock circuitry 130. For example, every third clock pulse of the system clock signal may be eliminated to reduce the speed at which microprocessor 100 executes instructions. The partially blocked clock signal may be provided to only a portion of the microprocessor 100 or to the entire microprocessor 100.

Limiting the number of instructions executed by the microprocessor 100 may be achieved by selectively disabling one or more functional units thereof or, alternatively, by selectively limiting instructions sent to one or more functional units. As an example of the first approach, during an arithmetic intensive application, operation of the execution unit 150 may be temporarily halted to cool die 105 in the vicinity of execution unit 150. As an example of the latter approach, again during an arithmetic intensive application, only selected instructions are delivered to execution unit 150, while delivery of other instructions is temporarily halted, to allow die 105 to cool. In a further alternative embodiment, rather than selectively disabling one or more functional units of microprocessor 100, the power consumption of microprocessor 100 may be reduced by changing the behavior of one or more of its functional units.

In an alternative embodiment, the temperature detection element 220 is configured to provide a signal at output 239 of comparator 230 for each of a plurality of trip levels, the highest trip level corresponding to $T_{trip}$ and the other trip levels corresponding to subsequently lower temperatures. Providing multiple trip levels allows power modulation element 240 to perform adaptable power reduction. For example, the plurality of trip levels may correspond to an equal number of programmed power reduction schemes. At the lowest detected temperature, power modulation element 240 would implement one type of power reduction mechanism, such as engaging clock gating or throttling. If the next highest temperature is detected by temperature sensor 222, power modulation element 240 would initiate another power reduction mechanism—for instance, lowering the supply voltage 102 to microprocessor 100. Higher trip levels would result in the performance of other power reduction mechanisms, or combinations thereof. Finally, at the trip point, power modulation element 240 would execute yet another power reduction mechanism, such as the selective disabling of functional units.

Generally, the duty cycle of power modulation element 240 is static, and the same duty cycle is used whenever clock throttling is performed. Providing multiple trip levels, however, also allows for use of a programmable duty cycle while performing clock throttling. At the lowest detected temperature, clock throttling may be performed at a first duty cycle and, at the next highest detected temperature, a second duty cycle may be imposed during clock throttling. Power modulation element 240 is similarly programmed with duty cycles for each successively higher trip level, including the trip point. Thus, the duty cycle used during clock throttling may vary dynamically with changes in thermal conditions.

Control element 260 (see FIG. 3) comprises one or more registers 265 enabling control over the behavior of thermal management system 200. For example, a register 265 may be configured to provide an enable/disable bit, allowing the thermal management system 200 to be selectively enabled. Other registers 265 may provide the ability to disengage or by-pass specific elements or components of thermal management system 200. By way of example, it may be desirable to disable one or more of the pulse dampener 232, analog filter 234, and digital filter 236 for testing. Also, a register 265 may provide for activation of thermal management system 200 upon the occurrence of some external event. For example, in a multi-processor computer system, when an elevated temperature is sensed in one microprocessor, it may be desirable to engage the thermal management systems of other microprocessors in the system, irrespective of whether the thermal management system of each of those other microprocessors was enabled. Alternatively, a register 265 may provide a force active bit, enabling the thermal management system 200 to be forced into operation, thereby overriding any enable/disable bit that has been set to disable or any external software that has shut down the thermal management system 200.

A further aspect of control element 260 is compatibility with the Advanced Configuration and Power Interface (ACPI) specification, enabling control of thermal management system 200 by external software and devices. See *Advanced Configuration and Power Interface Specification*, Revision 2.0, Jul. 27, 2000. The ACPI specification defines a hardware and software environment that allows operating system software complete visibility and control of system configuration and power management. Control element 260 includes at least a register 267—defined in the ACPI as the "Processor Control" register, or "P_CNT"—that enables clock throttling and can force thermal control to begin. The P_CNT register also provides for the setting of a duty cycle. The incorporation of all elements of thermal management system 200 entirely on microprocessor 100 in combination with the P_CNT register defined by the ACPI specification enables the operating system software running on computer system 5 to initiate thermal management on microprocessor 100. This holds true even when microprocessor 100 comprises one among many microprocessors in a multi-processor system and the system's chipset does not support per processor clock throttling, because thermal management system 200 is contained entirely on microprocessor 100.

Visibility element 280 (see FIG. 3) comprises a plurality of devices enabling the outside world—e.g., computer system 5—to monitor the status of thermal management system 200. The output 239 at comparator 230 of temperature sensor 222 provides a signal (either logical high or logical low) than can be monitored by external devices, enabling some action to be taken at the system level if the die temperature reaches the trip point. Similarly, the visibility element 280 may include a register 281 providing a status bit indicating the state of comparator 230, essentially providing the same information as the output 239 at comparator 230. In addition, the visibility element 280 may include a register 282 providing a "sticky" bit. The sticky bit is set the first time the temperature sensor 222 detects a trip point, and the sticky bit must be explicitly cleared by a software command or by a microprocessor reset. Such a sticky bit may, for example, be used by diagnostic software to determine if the die 105 had ever reached the trip point temperature.

Another visibility mechanism that may be provided by visibility element 280 is the ability to generate an interrupt whenever there is a state change at output 239 of comparator 230. Such an interrupt can be generated when the thermal sensor 222 transitions to $T_{trip}$ (i.e., from a "not hot" state to a "hot" state) and/or when the thermal sensor transitions to $T_{untrip}$ (i.e., from the "hot" state to the "not hot" state). Each of these interrupts can be individually enabled or disabled by registers 283, 284, respectively.

In addition, visibility element 280 may include one or more counters 286 configured to count the number of clock cycles lost as a result of thermal management system 200. The information provided by such a counter 286 may provide a useful tool for a number of purposes. For example, knowledge of lost clock cycles can be used by microprocessor designers for design verification and management. Knowledge of lost clock cycles may be used for thermal management itself. By way of example, if a pre-determined number of clock cycles are counted, the thermal management system 200 may be configured to take additional action to even further reduce power consumption of microprocessor 100. Similarly, counter 286 may be used to generate interrupts when a specified number of lost clock cycles is exceeded. Information from counter 286 may also be used to create an error log for use in system maintenance.

Those of ordinary skill in the art will understand that the various functional units of microprocessor 100—i.e., bus interface unit 110, address translation unit 120, instruction decoder unit 140, execution unit 150, and register file unit 160—as well as the elements of thermal management system 200—i.e., temperature detection element 220, power modulation element 240, control element 260, and visibility element 280—are not necessarily discrete circuit components but, rather, one or more of these functional units or elements may be integrated or share common circuitry. For example, thermal management system 200 and one or more functional units of microprocessor 100 may have common circuitry.

The above-described temperature detection, power modulation, control, and visibility elements 220, 240, 260, 280 are integrated into a single thermal management system 200 fabricated directly and contained entirely on die 105 and providing closed-loop thermal control on microprocessor 100. The tight integration amongst these elements and with microprocessor 100 provides a number of advantages. Guard bands are minimized and latency reduced, resulting in improved accuracy and chip-level reliability. By providing improved reliability at the chip level, greater device protection for microprocessor 100 is achieved, thereby providing higher system-level reliability and fewer failures in higher level systems. In addition, greater power control is provided by thermal management system 200; however, there is no comparable increase in manufacturing costs associated with this improved performance and control, as the on-chip fabrication of thermal management system will not significantly increase manufacturing costs, as noted above.

Figure 6:
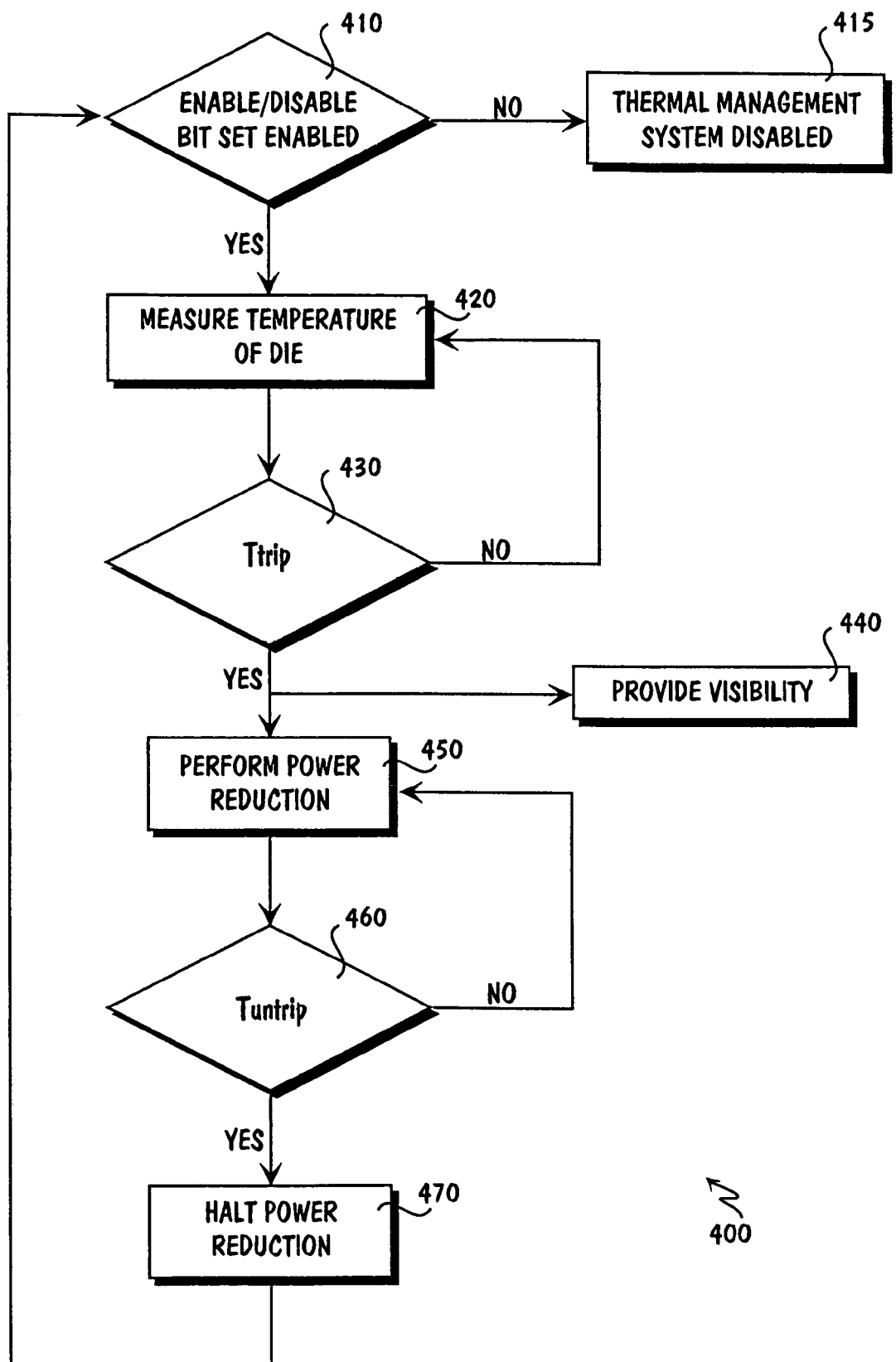
FIG. 6 is a block diagram of one embodiment of a method of performing thermal management.

Shown in FIG. 6 is a schematic diagram of one embodiment of a method of thermal management 400. The method of thermal management 400, which may be used for thermal management of, for example, microprocessor 100, may be initiated in control element 260. Denoted at 410, if the enable/disable bit in a register 265 of control element 260 is set to disable, thermal management system 200 is disabled, which is denoted at 415. If the enable/disable bit in the register 265 is set to enable, the thermal management system 200 will switch to active and temperature detection element 220 will commence measurement 420 of the temperature of die 105 at the location of temperature sensor 222 or, optionally, at multiple die locations if more than one sensor 222 is employed. In an alternative embodiment, temperature detection element 220 is always measuring the temperature at one or more die locations, and setting the enable/disable bit to enable simply allows the thermal management system 200 to act on the output 239 of temperature sensor 222 (or the output of digital filter 236).

In alternative embodiments, other registers 265 of control element 260 may be employed during thermal management method 400. Registers 265 of control element 260 may be used to disengage or by-pass specific elements or components of thermal management system 200, to cause activation of thermal management system 200 upon the occurrence of some external event, or to force activation of thermal management system 200 in order to override the enable/disable bit or external software (e.g., a command received on the P_CNT register 267). In a further alternative embodiment, external software, such as the operating system running on computer system 5, may activate thermal management system 200 via P_CNT register 267.

If the temperature sensor 222 detects $T_{trip}$, which is denoted at 430 in FIG. 6, power modulation element 240 will be engaged to initiate power reduction 450. Power modulation element 240 may employ any one of a number of power reduction mechanisms to reduce power consumption of microprocessor 100 and lower the temperature of die 105. Power consumption of microprocessor 100 may be reduced by lowering the supply voltage 102 thereto, by lowering the system clock frequency of microprocessor 100, by initiating clock gating or clock throttling of the system clock, by selectively blocking clock pulses generated by internal clock circuitry 130, by disabling one or more selected functional units of microprocessor 100, by selectively limiting instructions sent to one or more functional units of microprocessor 100, by changing the behavior of one or more functional units of microprocessor 100, or by engaging any combination of these mechanisms. In an alternative embodiment of the method of thermal management 400, in which the temperature sensor 222 is configured to provide an output at comparator 230 for multiple trip points, thermal management system 200 may utilize any one or suitable combination of the above-noted power reduction mechanisms at each of the multiple trip points. In a further alternative embodiment, a programmable duty cycle is employed to provide a specified duty cycle at each of a plurality of trip points.

In another embodiment of thermal management method 400, visibility element 280 provides visibility 440 into thermal management system 200. Thermal management visibility 440 may be provided by the output 239 of temperature sensor comparator 230, by a status bit in register 281 indicating the state of comparator 230, by providing a sticky bit in register 282 to indicate the first occurrence of $T_{trip}$, by the generation of an interrupt when the state of comparator 239 changes, or by a counter 286 indicating the number of clock cycles lost due to thermal management.

If $T_{untrip}$ is detected by thermal sensor 222, as denoted at 460 in FIG. 6, any power reduction mechanisms being implemented by thermal management system 200 are halted 470. So long as the enable/disable bit of control element 260 is set to enable, thermal management system 200 continues to monitor the temperature of die 105 at location of temperature sensor 222 and to execute appropriate power reduction measures as required.

In an alternative embodiment, power reduction 450 is conducted for a set period of time and, upon expiration of the set time period, the temperature sensor 222 is polled. If the temperature sensor 222 indicates the die temperature is below $T_{trip}$, power reduction is halted 470. If, however, the temperature sensor indicates that the die temperature is at or above $T_{trip}$, power reduction 450 is continued for another of the set time periods, and the process repeats until the die temperature falls below $T_{trip}$. In a further alternative embodiment, after expiration of the first initial time period, the temperature sensor 222 is polled continuously until the die temperature falls below $T_{trip}$, at which time any power reduction mechanisms are halted 470.

The method of performing thermal management 400 of an IC device provides on-chip, closed-loop temperature control at one or more die locations. The method 400 utilizes the integrated elements—temperature detection element 220, power modulation element 240, control element 260, and visibility element 280—of the thermal management system 200. However, in alternative embodiments, the method of thermal management 400 may proceed without using all of these elements. By way of example, a method of thermal management 400 may not include the provision of visibility 440 (see FIG. 6).

The foregoing detailed description and accompanying drawings are only illustrative and not restrictive. They have been provided primarily for a clear and comprehensive understanding of the illustrated embodiments and no unnecessary limitations are to be understood therefrom. Numerous additions, deletions, and modifications to the embodiments described herein, as well as alternative arrangements, may be devised by those skilled in the art without departing from the spirit of the present invention and the scope of the appended claims.

The invention claimed is:

1. A thermal management system for an integrated circuit die comprising:
   a temperature sensor formed directly on the die, the temperature sensor including a reference voltage source providing a reference voltage, a second voltage source providing a second voltage proportional to a temperature of the die, and a comparator coupled with each of the reference voltage and second voltage sources, the comparator to provide a signal to an output of the temperature sensor indicative of the die temperature;
   a power modulation element formed directly on the die, the power modulation element to reduce power consumption of the die in response to the output of the temperature sensor;
   a control element formed directly on the die, the control element including at least one register to provide an enable/disable bit for the thermal management system; and
   a visibility element formed directly on the die, the visibility element to indicate a status of the output of the temperature sensor.

2. The thermal management system of claim 1, wherein the second voltage source comprises a programmable voltage source providing a programmable voltage.

3. The thermal management system of claim 2, wherein the comparator provides a logical high signal if the programmable voltage substantially equals the reference voltage and provides a logical low signal if the programmable voltage is less than the reference voltage, and wherein the programmable voltage source can be programmed such that the logical high signal is provided at a selected threshold temperature.

4. The thermal management system of claim 1, further comprising a pulse dampener to at least partially remove electrical noise from the reference voltage.

5. The thermal management system of claim 1, further comprising an analog filter to detect voltage spikes present in the reference voltage and to add substantially identical voltage spikes to the second voltage.

6. The thermal management system of claim 1, further comprising a digital filter coupled to an output of the comparator, the digital filter including an up-down counter to count clock pulses, the up-down counter to increment once for each clock pulse detected when the comparator output is at a first state and to decrement once for each clock pulse detected when the comparator output is at a second state.

7. The thermal management system of claim 1, the control element further including at least one register selected from a group consisting of a register to selectively disengage a specified portion of the thermal management system, a register to enable the thermal management system in response to an occurrence of an external event, a register to force the thermal management system active while overriding a disable bit provided by the at least one register, and a register to allow external software and hardware to enable the thermal management system.

8. The thermal management system of claim 1, the visibility element including at least one device selected from a group consisting of a register to indicate a status of the temperature sensor output, a register to provide a sticky bit, a counter to count a number of lost clock cycles resulting from operation of the thermal management system, and circuitry to generate an interrupt when the temperature sensor output transitions to a different state.

9. The thermal management system of claim 1, the power modulation element to reduce the power consumption of the die by performing at least one action selected from a group consisting of lowering a supply voltage to the die, lowering a frequency of a clock signal provided by internal clock circuitry on the die, performing clock gating of the clock signal, performing clock throttling of the clock signal, selectively blocking clock pulses of the clock signal, disabling at least one of a plurality of functional units on the die, limiting instructions sent to at least one of the plurality of functional units, and changing a behavior of at least one of the plurality of functional units.

10. The thermal management system of claim 1, wherein the comparator provides a logical high signal if the second voltage substantially equals the reference voltage and provides a logical low signal if the second voltage is less than the reference voltage.

11. An apparatus comprising: a die; and
a thermal management system formed directly on the die, the thermal management system including
a temperature sensor, the temperature sensor including a reference voltage source providing a reference voltage, a second voltage source providing a second voltage proportional to a temperature of the die, and a comparator coupled with each of the reference voltage and second voltage sources, the comparator to provide a signal to an output of the temperature sensor indicative of the die temperature;
a power modulation element to reduce power consumption of the die in response to the output of the temperature sensor;
a control element including at least one register to provide an enable/disable bit for the thermal management system; and
a visibility element to indicate a status of the output of the temperature sensor.

12. The apparatus of claim 11, wherein the second voltage source comprises a programmable voltage source providing a programmable voltage.

13. The apparatus of claim 12, wherein the comparator provides a logical high signal if the programmable voltage substantially equals the reference voltage and provides a logical low signal if the programmable voltage is less than the reference voltage, and wherein the programmable voltage source can be programmed such that the logical high signal is provided at a selected threshold temperature.

14. The apparatus of claim 11, further comprising a pulse dampener to at least partially remove electrical noise from the reference voltage.

15. The apparatus of claim 11, further comprising an analog filter to detect voltage spikes present in the reference voltage and to add substantially identical voltage spikes to the second voltage.

16. The apparatus of claim 11, further comprising a digital filter coupled to an output of the comparator, the digital filter including an up-down counter to count clock pulses, the up-down counter to increment once for each clock pulse detected when the comparator output is at a first state and to decrement once for each clock pulse detected when the comparator output is at a second state.

17. The apparatus of claim 11, the control element further including at least one register selected from a group consisting of a register to selectively disengage a specified portion of the thermal management system, a register to enable the thermal management system in response to an occurrence of an external event, a register to force the thermal management system active while overriding a disable bit provided by the at least one register, and a register to allow external software and hardware to enable the thermal management system.

18. The apparatus of claim 11, the visibility element including at least one device selected from a group consisting of a register to indicate a status of the temperature sensor output, a register to provide a sticky bit, a counter to count a number of lost clock cycles resulting from operation of the thermal management system, and circuitry to generate an interrupt when the temperature sensor output transitions to a different state.

19. The apparatus of claim 11, the power modulation element to reduce the power consumption of the die by performing at least one action selected from a group consisting of lowering a supply voltage to the die, lowering a frequency of a clock signal provided by internal clock circuitry on the die, performing clock gating of the clock signal, performing clock throttling of the clock signal, selectively blocking clock pulses of the clock signal, disabling at least one of a plurality of functional units on the die, limiting instructions sent to at least one of the plurality of functional units, and changing a behavior of at least one of the plurality of functional units.

20. The apparatus of claim 11, wherein the comparator provides a logical high signal if the second voltage substantially equals the reference voltage and provides a logical low signal if the second voltage is less than the reference voltage.

21. A system comprising:
a memory coupled with a bus; and
a processor coupled with the bus, the processor including
a die and a thermal management system formed directly on the die, the thermal management system including
a temperature sensor, the temperature sensor including a reference voltage source providing a reference voltage, a second voltage source providing a second voltage proportional to a temperature of the die, and a comparator coupled with each of the reference voltage and second voltage sources, the comparator to provide a signal to an output of the temperature sensor indicative of the die temperature;
a power modulation element, the power modulation element to reduce power consumption of the processor in response to the output of the temperature sensor;
a control element, the control element including at least one register to provide an enable/disable bit; and
a visibility element, the visibility element to indicate a status of the output of the temperature sensor.

22. The system of claim 21, wherein the second voltage source comprises a programmable voltage source providing a programmable voltage.

23. The system of claim 22, wherein the comparator provides a logical high signal if the programmable voltage substantially equals the reference voltage and provides a logical low signal if the programmable voltage is less than the reference voltage, and wherein the programmable voltage source can be programmed such that the logical high signal is provided at a selected threshold temperature.

24. The system of claim 21, further comprising a pulse dampener to at least partially remove electrical noise from the reference voltage.

25. The system of claim 21, further comprising an analog filter to detect voltage spikes present in the reference voltage and to add substantially identical voltage spikes to the second voltage.

26. The system of claim 21, further comprising a digital filter coupled to an output of the comparator, the digital filter including an up-down counter to count clock pulses, the up-down counter to increment once for each clock pulse detected when the comparator output is at a first state and to decrement once for each clock pulse detected when the comparator output is at a second state.

27. The system of claim 21, the control element further including at least one register selected from a group consisting of a register to selectively disengage a specified portion of the thermal management system, a register to enable the thermal management system in response to an occurrence of an external event, a register to force the thermal management system active while overriding a disable bit provided by the at least one register, and a register to allow external software and hardware to enable the thermal management system.

28. The system of claim 21, the visibility element including at least one device selected from a group consisting of a register to indicate a status of the temperature sensor output, a register to provide a sticky bit, a counter to count a number of lost clock cycles resulting from operation of the thermal management system, and circuitry to generate an interrupt when the temperature sensor output transitions to a different state.

29. The system of claim 21, the power modulation element to reduce the power consumption of the processor by performing at least one action selected from a group consisting of lowering a supply voltage to the die, lowering a frequency of a clock signal provided by internal clock circuitry on the die, performing clock gating of the clock signal, performing clock throttling of the clock signal, selectively blocking clock pulses of the clock signal, disabling at least one of a plurality of functional units on the die, limiting instructions sent to at least one of the plurality of functional units, and changing a behavior of at least one of the plurality of functional units.

30. The system of claim 21, wherein the comparator provides a logical high signal if the second voltage substantially equals the reference voltage and provides a logical low signal if the second voltage is less than the reference voltage.

* * * * *